United States Patent
Kawada et al.

(10) Patent No.: US 6,578,689 B2
(45) Date of Patent: Jun. 17, 2003

(54) ELECTROMAGNETIC CLUTCH AND A COMPRESSOR PROVIDED WITH ELECTROMAGNETIC CLUTCH

(75) Inventors: Minoru Kawada, Nishi-kasugai-gun (JP); Makoto Hattori, Nishi-kasugai-gun (JP); Yoshikatsu Azuma, Nishi-kasugai-gun (JP); Hirohide Andoh, Nagoya (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/941,801

(22) Filed: Aug. 30, 2001

(65) Prior Publication Data

US 2002/0029949 A1 Mar. 14, 2002

(30) Foreign Application Priority Data

Aug. 31, 2000 (JP) ........................................ 2000-264533

(51) Int. Cl.[7] .............................................. F16D 27/112
(52) U.S. Cl. .............................. 192/84.961; 192/107 R; 335/279
(58) Field of Search ........................ 192/84.961, 107 R; 335/279

(56) References Cited

U.S. PATENT DOCUMENTS

| | | | |
|---|---|---|---|
| 1,944,831 A | 1/1934 | Whyte | |
| 5,036,964 A | * 8/1991 | Booth et al. | 192/84.5 |
| 5,231,748 A | 8/1993 | Knudson et al. | |
| 5,250,921 A | 10/1993 | Van Laningham et al. | |
| 5,372,228 A | * 12/1994 | VanLaningham et al. | 192/84.941 |
| 6,194,803 B1 | * 2/2001 | Heim et al. | 310/92 |
| 2002/0000355 A1 | * 1/2002 | Hattori et al. | 192/84.961 |

FOREIGN PATENT DOCUMENTS

| | | |
|---|---|---|
| EP | 0 836 026 | 4/1998 |
| FR | 897 948 | 4/1945 |
| JP | 8-247181 A * | 9/1996 |
| JP | 2000-179583 A * | 6/2000 |

* cited by examiner

Primary Examiner—Richard M. Lorence
(74) Attorney, Agent, or Firm—Oblon, Spivak, McClelland, Maier & Neustadt, P.C.

(57) ABSTRACT

The invention provides an electromagnetic clutch that effectively reduces the shock noise produced during the coupling of an armature plate and a drive rotor, and furthermore, has a laminated body that can be provided at a low cost as an essential constituent element. The armature plate 34 of the electromagnetic clutch is a laminated body that comprises a plurality of thin metal plates 41, a plurality of fastening tongues 45 project from the inner diameter side of the friction plate 42 on the friction surface side, and these fastening tongues 45 are bent and surround the other laminated thin metal plates 41 so as to fasten them.

6 Claims, 7 Drawing Sheets

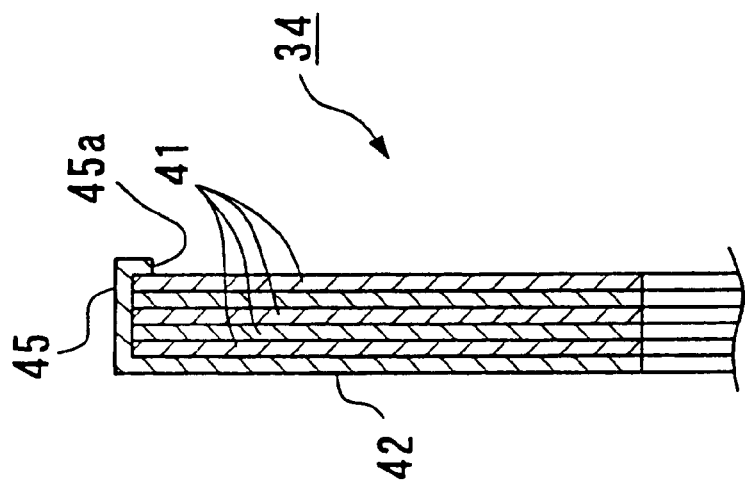
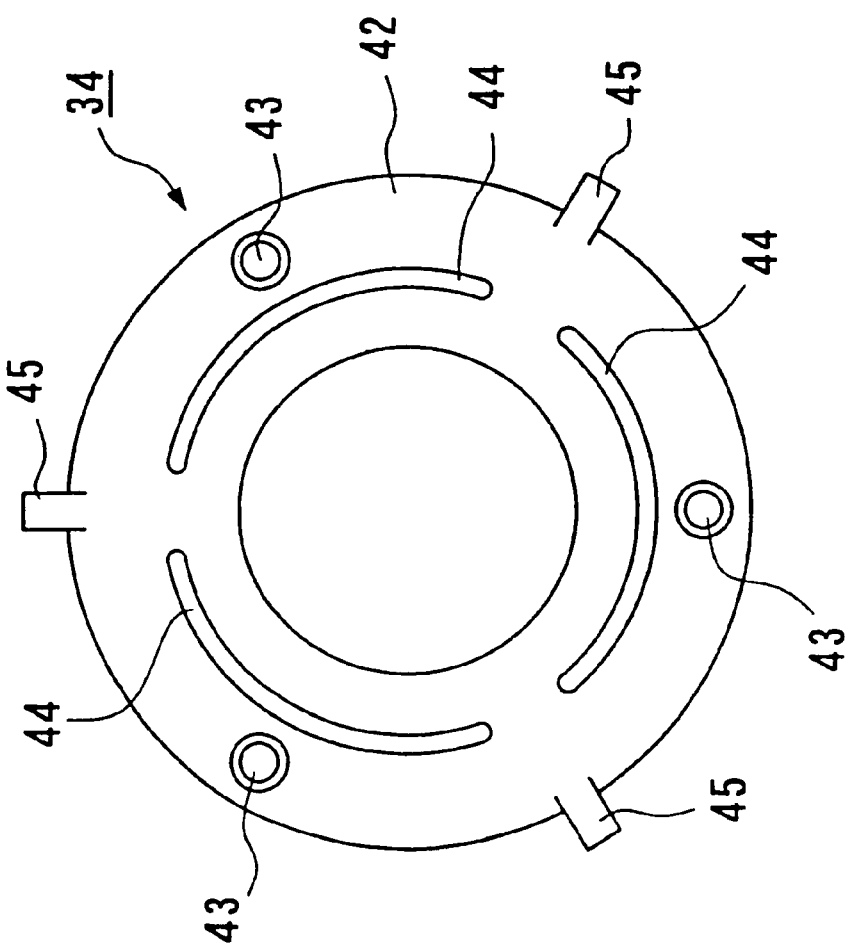

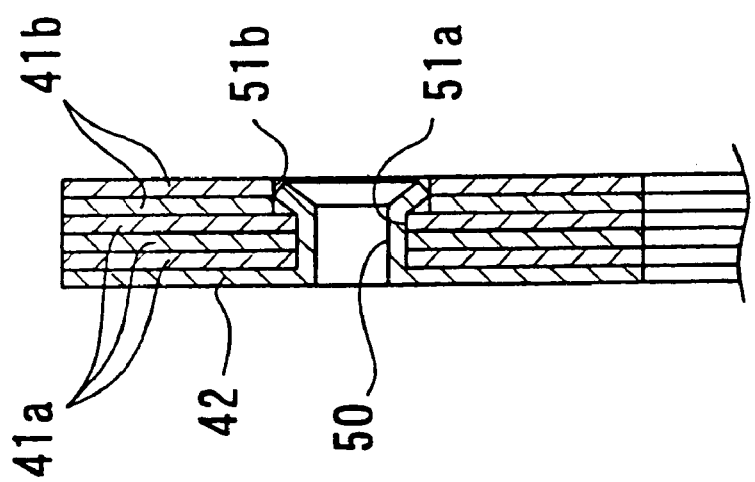
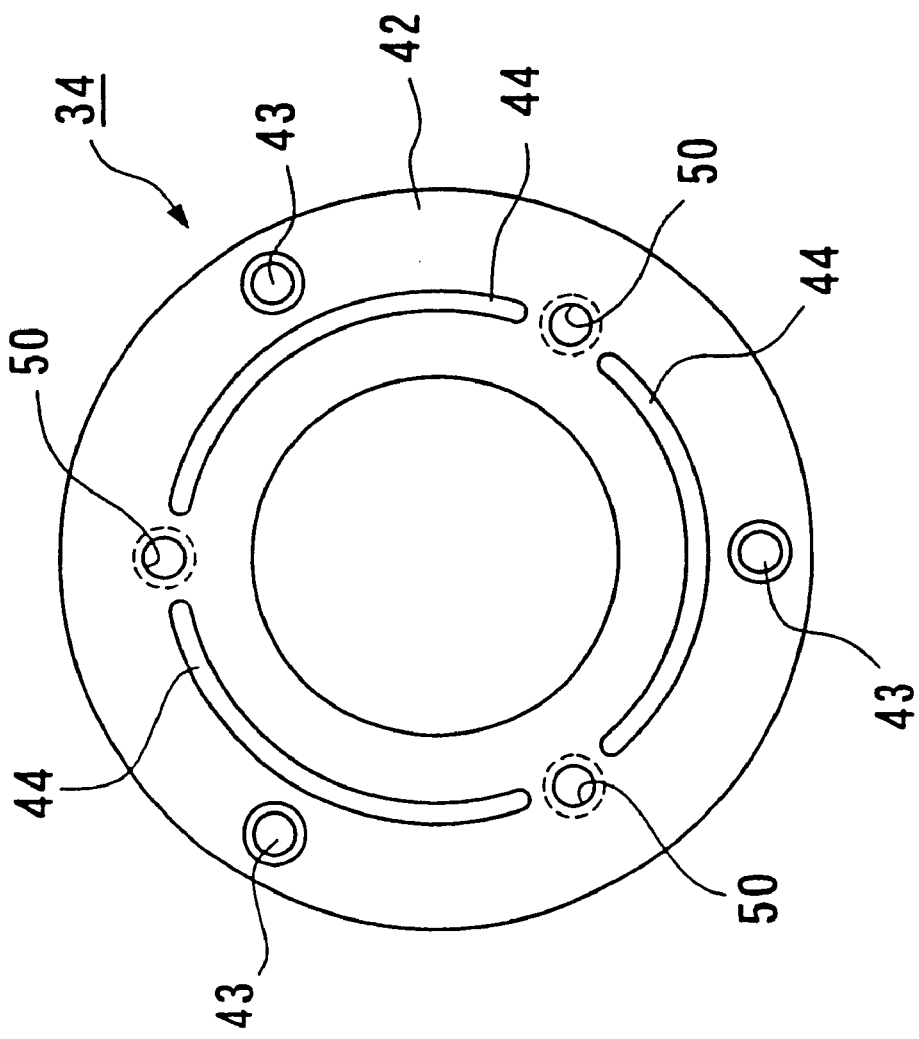

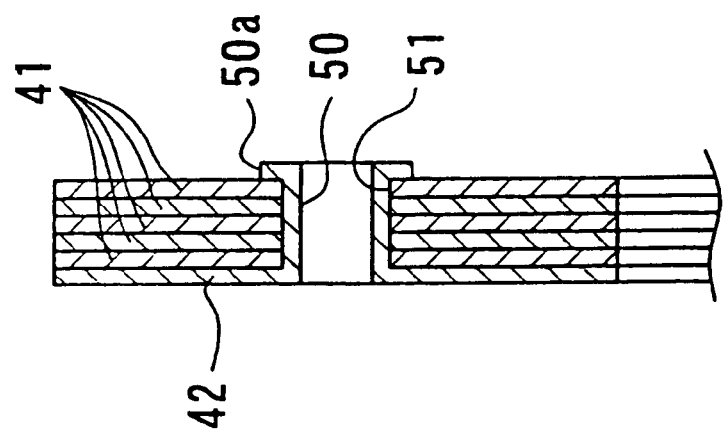
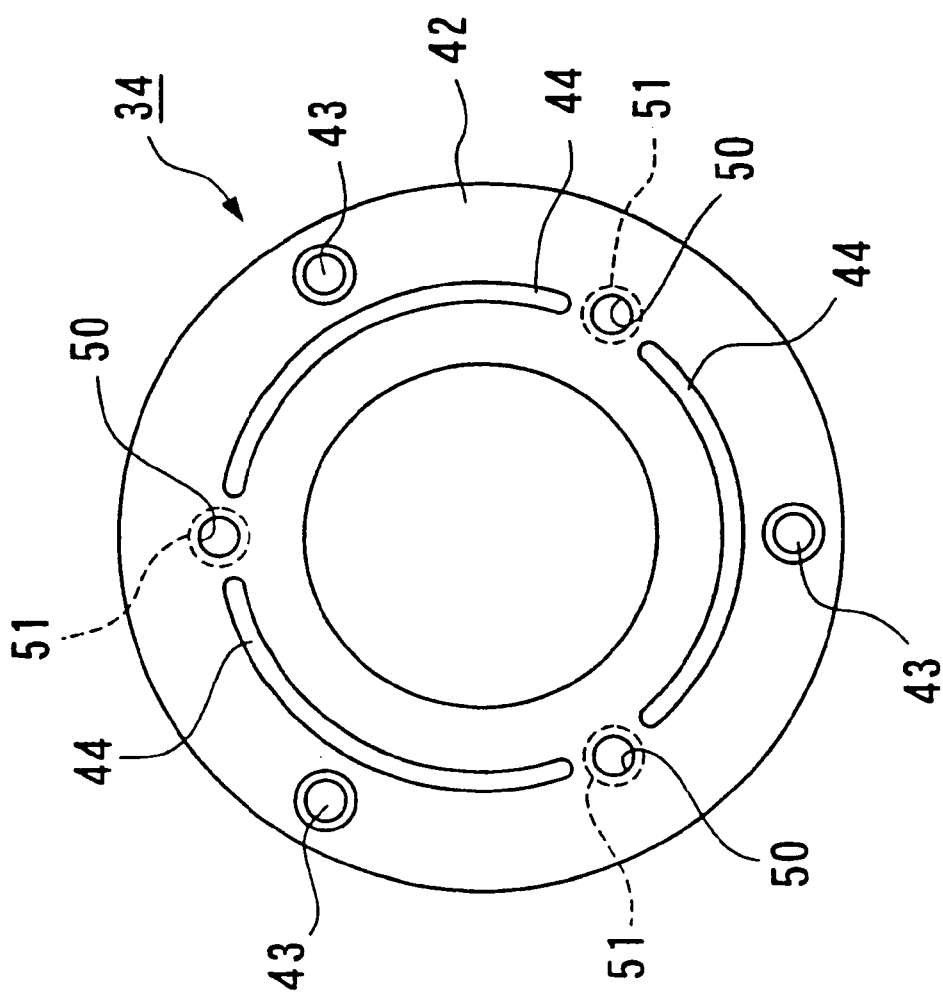

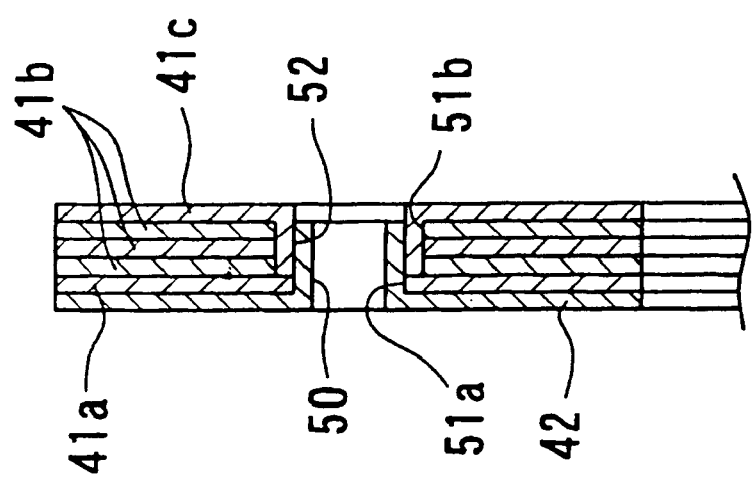
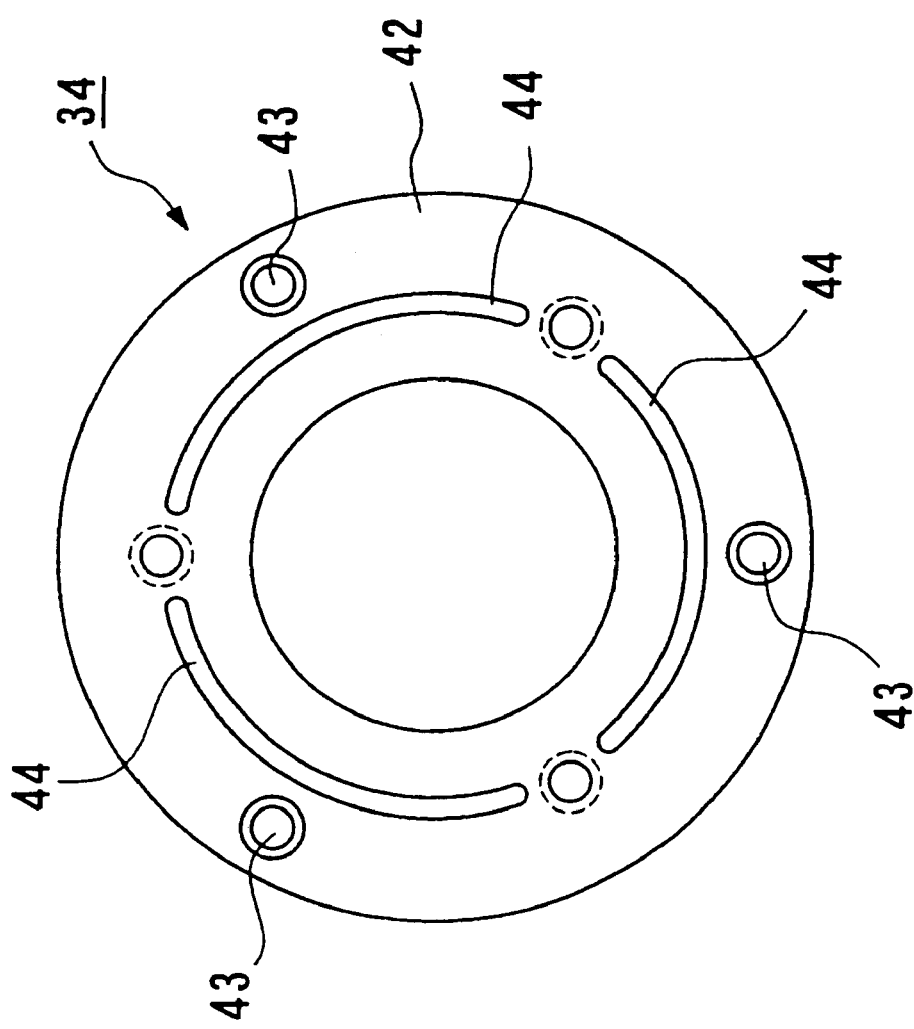

ELECTROMAGNETIC CLUTCH AND A COMPRESSOR PROVIDED WITH ELECTROMAGNETIC CLUTCH

BACKGROUND OF THE INVENTION

1. Field of the Invention

The present invention relates to an electromagnetic clutch advantageously used, for example, in the air conditioning system of an automobile, and a compressor provided with this electromagnetic clutch.

2. Description of the Related

FIG. 8 is a cross-sectional drawing showing an example of a conventional electromagnetic clutch.

This electromagnetic clutch 100 is provided in the compressor of, for example, the air conditioning system of an automobile, and is mechanically and intermittently connected to the compressor and a drive source (not illustrated), and disposed in the nose part 101 of the front case of the compressor.

On the periphery of the nose part 101, the drive rotor 103 is supported freely rotatably by the clutch bearings 102, and a coil 104 is built into on this drive rotor 103. An armature plate 105 having an identical axis line is disposed so as to oppose this drive rotor 103. Moreover, the reference numeral 104a in the figure is the coil housing.

A hub 106 is anchored by a nut 107 on the projecting part of the drive axle 112 of the compressor. One end of the connection plate 108 is anchored to the hub 106 by the rivet 110, and the other end is anchored to the armature plate 105 by the rivet 109. The electromagnetic clutch 100 is formed having as essential components the clutch bearing 102, the drive rotor 103, the coil 104, the armature plate 105, the hub 106, the connection plate 108, and the rivets 109 and 110 described above.

In addition, a belt pulley 111 is provided on the periphery of the drive rotor 103, and communicates with a drive source such as an engine via a V belt (not illustrated) that extends across thereto.

In the electromagnetic clutch 100 having the structure described above, the drive rotor 103 communicates with a drive source such as an engine, and thus is always rotating while the drive source is rotating. In this state, when current flows to the coil 104 and the coil 104 is energized, the armature plate 105 is engaged by the drive rotor 103 due to the magnetic force of the coil 104. In addition, the rotational torque of the drive source is transmitted to the drive axle 112 by, in sequence, the drive rotor 103, the armature plate 105, the rivet 109, the connecting plate 108, the rivet 110, and the hub 106. Thereby, the drive axle 112 of the compression component is caused to rotate. When the current to the coil 104 is stopped in this state, the armature plate 105 is separated from the drive rotor 103, and the power transmission to the drive axle 112 is interrupted.

However, in the electromagnetic clutch 100 of the compressor described above, the armature plate 105 is a single thick metal plate, and the drive rotor 103 is also made of metal, and formed as one body. In addition, when electricity flows through the coil 104 and the armature plate 105 is engaged by the drive rotor 103 due to the magnetic force of the coil 104, the armature plate 105 is coupled to the drive rotor 103 at a high speed in order to minimize the duration of the relative slippage with the end surface of the drive rotor 103. Thus, as described above, when current flows through the coil 104, and the armature plate 105 and the drive rotor 103 are coupled by engagement due to energizing the coil 104, there is the problem that a shock sound between the armature plate 105 and the end surface of the drive rotor 103 is produced, and decreasing this shock sound is desirable.

In this context, the inventors found that a laminated body in which a plurality of thin plates (plate body) are laminated to the walls that form the end surfaces of the armature plate and the drive rotor would be effective in decreasing the shock sound. However, to make this commercially viable, it is necessary to provide at a low cost a laminated body that comprises a plurality of laminated thin plates, and that can be reliably integrated. Furthermore, development of a laminated structure having an operability that is superior with respect to manufacture in a short period of time is desirable.

In consideration of the above described problems, it is an object of the present invention to provide an electromagnetic clutch and a compressor provided with this electromagnetic clutch that is effective in reducing the shock sound produced during the coupling of the armature plate and the drive rotor, and furthermore, having as an essential element a laminated body that can be provided at low cost.

SUMMARY OF THE INVENTION

In order to resolve the problems described above, in the present invention the following device was used.

In a first aspect of the invention, an electromagnetic clutch provides a drive rotor that is connected so as to communicate with a drive source and has a built in coil and an armature positioned opposite to said drive rotor, and having an armature plate disposed and on the same rotation axis line, in which the end surface of the drive rotor and the armature plate are engaged or separated due to the magnetic force of the coil when the coil is energized by the application of voltage, and the drive rotor and the armature are intermittently coupled in communication, wherein the armature plate is a laminated body comprising a plurality of plates, at least one of the outer surface plate or the inner surface plate of the laminated body that serves as a friction surface has a plurality of fastening tongues protruding therefrom, and the laminated body is integrated by the fastening tongues being bent so as to surround the other laminated plates such that they are fastened.

According to this type of electromagnetic clutch, because the laminated body is integrated by the fastening tongue being bent so as to surround the other laminated plates such that they are fastened, a reliably integrated laminated body is easily obtained, and furthermore, because the operability is superior in comparison to integration by welding, etc., manufacture is possible in a short period of time and at a low cost.

The fastening tongue in this case can either be (1) provided only on the outer surface plate, (2) provided only on the inner surface plate, or provided on both the outer surface plate and the inner surface plate.

In a second aspect of the invention, an electromagnetic clutch provides a drive rotor that is connected so as to communicate with a drive source and has a built in coil and an armature positioned opposite to said drive rotor, and having an armature plate disposed and on the same rotation axis line, in which the end surface of the drive rotor and the armature plate are engaged or separated due to the magnetic force of the coil when the coil is energized by the application of voltage, and the drive rotor and the armature are intermittently coupled in communication, wherein the armature plate is a laminated body comprising a plurality of laminated plates, cylindrical bar-ring integrating parts are provided on the plate of one end surface side and through holes are provided on the other plates, and the laminated body is integrated by inserting and fastening the bar-ring integrating parts into the through holes.

According to this type of electromagnetic clutch, because the laminated body is integrated by inserting and fastening the bar-ring integrating parts into the through holes, a reliably integrated laminated body can be manufactured in a short period of time period and at a low cost.

In this case, the bar-ring integrating parts inserted into the through holes do not project from the through holes, and are fastened on the inside by expanding the diameter, or similarly, the diameter is expanded and the distal end of the bar-ring integrating parts project from the through holes and are bent so as to attach to the end surface on the opposite side.

Moreover, in the fastening structure in which the bar-ring integrating parts do not project out of the through holes, there is no restriction on which plate on the end surface side provides the bearing formation part, but in the fastening structure in which they project out of the through holes, only the plate on the friction surface side can provide the bar-ring integrating parts.

In a third aspect of the invention, an electromagnetic clutch provides a drive rotor that is connected so as to communicate with a drive source and has a built in coil and an armature positioned opposite to said drive rotor, and having an armature plate disposed and on the same rotation axis line, in which the end surface of the drive rotor and the armature plate are engaged or separated due to the magnetic force of the coil when the coil is energized by the application of voltage, and the drive rotor and the armature are intermittently coupled in communication, wherein the armature plate is a laminated body comprising a plurality of laminated plates, cylindrical bar-ring integrating parts that each have a different diameter are provided on the plates on both of the end surface sides, and through holes are provided in the other plates, and the laminated body is integrated by inserting the bar-ring integrating parts into the through holes from both sides, and engaging and fastening the one to the other.

According to this type of electromagnetic clutch, because the laminated body is integrated by the simple operation of inserting the bar-ring integrating parts provided on one end surface side of the plate into the through holes and then engaging and fastening the bar-ring integrating parts provided on the end surface side of the plate on the opposite side, a more reliably integrated laminated body can be manufactured in a short period of time and at a low cost.

In this case, the bar-ring integrating parts having the small diameter can be fastened by enlarging the diameters on the inside, without projecting from the through holes, or enlarging the diameter in a similar manner, the distal end of the bar-ring integrating parts on the small diameter side can project from the through holes and be bent so as to attach to the end surface on the opposite side.

Moreover, with the fastening structure in which the bar-ring integrating parts on the small diameter side project from the through holes and whose distal ends are bent, the bar-ring integrating parts provided on the plates on the friction surface side must be made the ones on the small diameter side.

In a fourth aspect of the invention, an electromagnetic clutch provides a drive rotor that is connected so as to communicate with a drive source and has a built in coil and an armature positioned opposite to said drive rotor, and having an armature plate disposed and on the same rotation axis line, in which the end surface of the drive rotor and the armature plate are engaged or separated due to the magnetic force of the coil when the coil is energized by the application of voltage, and the drive rotor and the armature are intermittently coupled in communication, wherein the drive rotor has an integrally formed body part and a wall part that forms the end surface of the drive rotor; and the wall part is a laminated body comprising a plurality of plates, a plurality of fastening tongues project from at least one of the outer surface plate or inner surface plate of the plate that serves as the friction surface side, and said laminated body is integrated by bending said fastening tongues so s to surround the other laminated plates and fasten them.

According to this electromagnetic clutch, because the fastening tongues provided on the plate of the friction surface side are bent so as to surround the other laminated plates such that they are fastened, a reliably integrated laminated body is easily obtained, and furthermore, because the operability is superior in comparison to integration by welding or the like, it can be manufactured in a short period of time and at a low cost.

The fastening tongue in this case can be (1) provided on only the outer surface of the laminated body, (2) provided on only the inner surface plate, or (3) provided on both the outer surface and the inner surface plates.

According to a fifth aspect of the invention, an electromagnetic clutch provides a drive rotor that is connected so as to communicate with a drive source and has a built in coil and an armature positioned opposite to said drive rotor, and having an armature plate disposed and on the same rotation axis line, in which the end surface of the drive rotor and the armature plate are engaged or separated due to the magnetic force of the coil when the coil is energized by the application of voltage, and the drive rotor and the armature are intermittently coupled in communication, wherein the drive rotor has an integrated body part and a wall part that forms the end surface of the drive rotor, and the wall part is a laminated body comprising a plurality of laminated plates, cylindrical bar-ring integrating parts are provided on the plate of one end surface side and through holes are provided on the other plates, and the laminated body is integrated by inserting the bar-ring integrating parts into the through holes and fastening them.

According to this type of electromagnetic clutch, because the laminated body can be integrated by the simple operation of inserting the bar-ring integrating parts into the through holes and fastening them, a reliably integrated laminated body can be manufactured in a short period of time and at a low cost.

In this case, the bar-ring integrating parts inserted into the through holes can be fastened by expanding the diameter on the inside without projecting from the through holes, or expanding the diameter in a similar manner, the distal end of the bar-ring integrating parts can project form the through holes and be bent so as to attach to the end surface of the opposite side.

Moreover, in this fastening structure in which the bar-ring integrating parts do not project from the through holes, there is no restriction on which plate on the end surface side provides the bar-ring integrating parts, but in the fastening structure in which they project from the through holes, only the plate on the friction surface side can provide the bar-ring integrating parts.

In a sixth aspect of the invention, an electromagnetic clutch provides a drive rotor that is connected so as to communicate with a drive source and has a built in coil and an armature positioned opposite to said drive rotor, and having an armature plate disposed and on the same rotation axis line, in which the end surface of the drive rotor and the armature plate are engaged or separated due to the magnetic force of the coil when the coil is energized by the application of voltage, and the drive rotor and the armature are intermittently coupled in communication, wherein the drive rotor has an integrated body part and a wall part that forms the end surface of the drive rotor; and the wall part is a laminated body comprising a plurality of laminated plates, cylindrical bar-ring integrating parts each having a different diameter are provided on the plate of both end surface sides, and through holes are provided on the other plates, the laminated body is integrated by inserting the bar-ring integrating parts into the through holes from both sides, and engaging and fastening the one to the other.

According to this type of electromagnetic clutch, because the laminated body is integrated by the simple operation of inserting the bar-ring integrating parts provided on the plate on both of the end surface sides, and then engaging and fastening the bar-ring integrating parts provided on the end plate of the end surface side of the opposite side, a more reliably integrated laminated body can be manufactured in a short period of time and at a low cost.

In this case, the bar-ring integrating parts on the small diameter side can be fastened by expanding the diameter inside without projecting from the through holes, or expanding the diameter in a similar manner, the distal end of the bar-ring integrating parts can project from the through holes and be bent so as to attach to the end surface of the opposite side.

Moreover, with the fastening structure in which the bar-ring integrating parts on the small diameter side project from the through holes and whose distal ends are bent, the bar-ring integrating parts provided on the plate on the friction surface side must be made the ones on the small diameter side.

According to a seventh aspect of the invention, the electromagnetic clutch is characterized in providing an armature plate according to any of the first through third aspects and a drive rotor according to any of the fourth through sixth aspects, and thereby the laminated body provided at a low cost can be used on the end surface of the armature plate and the drive rotor, and the shock can be more effectively reduced on both sides.

In an eighth aspect of the invention, in the compressor that compresses a liquid by the essential compression elements, the power of the drive source mechanically connected to the drive rotor via the electromagnetic clutch according to any of claim 1 through claim 6 is characterized in being propagated by the drive axle of the essential compressor elements mechanically connected to the armature, and the shock produced during the connection of the electromagnetic clutch that couples the armature plate and the drive rotor is reduced and becomes small, and thus a superior compressor can be provided that has improved silence during operation at low cost.

BRIEF DESCRIPTION OF THE DRAWINGS

FIGS. 2A and 2B are drawings showing the first embodiment of the present invention, wherein FIG. 2A is a frontal view drawing showing the armature plate shown in FIG. 1 from the friction surface side before fastening, and FIG. 2B is a cross sectional drawing of the essential components after fastening.

FIG. 3A and FIG. 3B are drawings showing a modified example of the first embodiment shown in FIG. 2A and FIG. 2B, wherein FIG. 3A is a frontal view drawing showing the armature plate shown in FIG. 1 from the friction surface side before fastening, and FIG. 3B is a cross sectional drawing of the essential components after fastening.

FIG. 4A and FIG. 4B are drawings showing the second embodiment of the present invention, wherein FIG. 4A is a frontal view drawing showing the armature plate shown in FIG. 1 from the friction surface side, and FIG. 4B is a cross-sectional diagram of the essential components showing the state after fastening.

FIG. 5A and FIG. 5B are drawings showing a modified example of the second embodiment shown in FIG. 4A and FIG. 4B, wherein FIG. 4A is a frontal view drawing showing the armature plate shown in FIG. 1 from the friction surface side, and FIG. 4B is a cross-sectional drawing of the essential components showing the state after fastening.

FIG. 6A and FIG. 6B are drawings showing the third embodiment of the present invention, wherein FIG. 6A is a frontal view drawing showing the armature plate shown in FIG. 1 from the friction surface side, and FIG. 6B is a cross-sectional view of the essential components showing the state after fastening.

DETAILED DESCRIPTION OF THE INVENTION

Below, the embodiments of the present invention will be explained referring to the figures.

Figure 1:
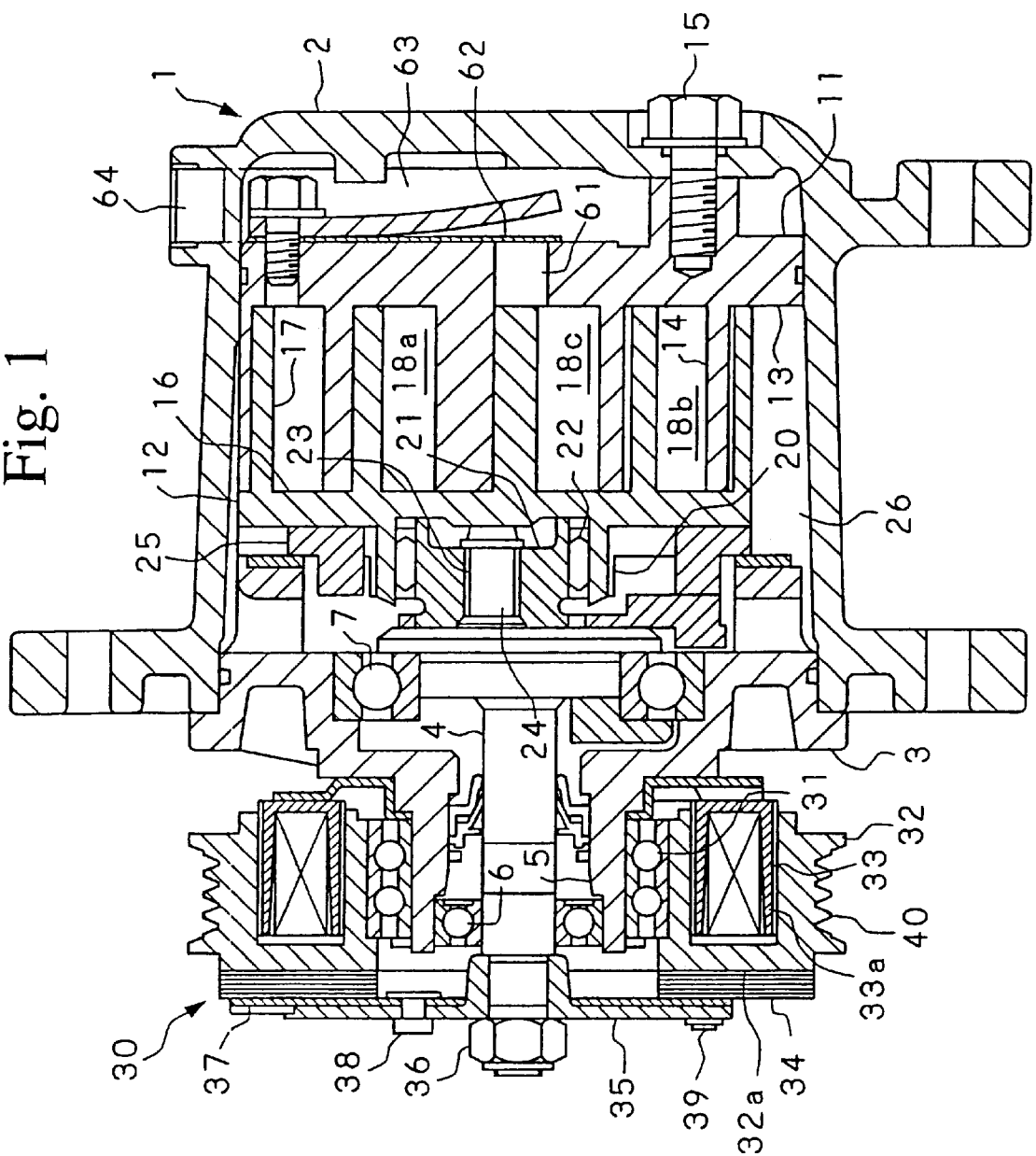
FIG. 1 is a cross-sectional drawing showing an example of the structure of a compressor according to an embodiment of the present invention.

FIG. 1 is a cross-sectional drawing showing an embodiment of the compressor according to the present invention.

In the compressor shown in FIG. 1, reference numeral 1 denotes the housing, and this housing 1 comprises a cap shaped body 2 and a front case fastened thereto by a bolt (not illustrated).

A scroll compressor comprising a stationary scroll 11 and a rotating scroll 12 is mounted in the cup shaped body 2.

The stationary scroll 11 provides an end plate 13 and an involute wrap 14 that rises from the inner surface thereof, and this end plate 13 is fastened to the cup shaped body 2 by the bolt 15. The rotating scroll 12 provides an end plate 16 and an involute wrap 17 that rises from the inner surface thereof. The rotating scroll 12 and the stationary scroll 11 are eccentric to each other by an amount equal to the radius of the rotation, and are provided offset by an angle of 180° so as to mesh. Thereby, a plurality of closed chambers 18a and 18b that are substantially symmetric with respect to the center of the spiral are formed.

Inside the cylindrical boss 20 that projects to the center of the outer surface of the end plate 16, a drive bushing 21 is accommodated freely rotatably by a rotation bearings 22, and in the eccentric hole 23 bored into the drive bushing 21, an eccentric actuation pin 24 abuts the inside end of the drive axle 4 is engaged freely rotatably. This drive axle 4 passes through the nose part 5 of the front case 3 to project to the outside, and pivots in the front case 3 by the bearings 6 and 7.

As shown in the figure, a drive rotor 32 is supported freely rotatably by clutch bearings 31 on the outer periphery of the nose part 5 of the front case 3, and a coil 33 that is anchored to the nose part 5 by an anchoring member is built into this drive rotor 32. Specifically, the drive rotor 32 is installed so as to freely rotate with respect to the fixed coil 33. In addition, an armature plate 34, which is a plurality of laminated thin plates (plate members), has an identical axis line and is mounted so as to oppose the drive rotor 32. Moreover, reference numeral 33a in the figure denotes a coil housing that accommodates the coil 33.

On the projecting part of the drive axle 4 of the compressor, a hub 35 is anchored by a nut 36. One end of the connecting plate 37 is anchored to this hub 35 by a rivet 38, and the other end is anchored to the armature plate 34 by the rivet 39.

The electromagnetic clutch 30 is formed having as essential components the above-described clutch axle 31, drive rotor 32, coil 33, armature plate 34, hub 35, connecting plate 37, and rivets 38 and 39. In addition, the armature is formed by the armature plate 34, the hub 35, the connecting plate 37, and the rivets 38 and 39.

A belt pulley 40 is provided on the periphery of the drive rotor 32, and communicates with a drive source such as an engine via a V belt (not illustrated) that extends across thereto.

The compressor having the structure described above operates as follows.

Because the drive rotor 32 is connected to a drive source such as an engine by a V belt, it is always rotating while the drive source such as the engine is rotating. In this state, when current passes through the coil 33 and the coil 33 is energized, the armature plate 34 is engaged by the end plate 32a of the drive rotor 32 due to the magnetic force of the coil 33. In addition, the rotation of the drive rotor 32 is transmitted to the drive axle 4 via the sequence of the armature plate 34, rivet 39, connecting plate 37, rivet 38, and the hub 35. Thereby, the drive axle 4 of the compressor mechanism is caused to rotate.

When the current to the coil 33 is stopped in this state, the armature 34 separates from the drive rotor 32, and the power transmission to the drive axle 4 is interrupted.

When the drive axle 4 is rotating, the rotating scroll 12 is actuated by the eccentric actuation pin 24, the drive bushing 21, and rotating bearing 22, and the boss 20, and with autorotation of the rotating scroll 12 being prevented by the autorotation prevention mechanism 25, it moves in a rotation on a circular orbit.

The line contact parts between each of the involute wraps 14 and 17 gradually move towards the center of the spiral, and thereby, the volume of the sealed chambers 18a and 18b decreases as they move towards the center of the spiral. Accompanying this, the gas that flows into the suction chamber 26 through the suction inlet (not illustrated) arrives at the chamber 18c in the center while being drawn into the sealed chambers 18a and 18b from the outer end opening between the involute wraps 14 and 17 and compressed. From there the gas passes through the discharge port 61 bored into the end plate 13 of the stationary scroll 11, is then discharged to the discharge cavity 63 by pushing open the discharge valve 62, and finally flows out therefrom via the discharge opening 64.

Next, in the compressor having the structure described above, the electromagnetic clutch having the characteristic parts of the present invention and the integrated structure of the laminated body, which comprises a plurality of laminated plates, used particularly in the wall of the armature plate and the drive rotor will be explained referring to FIGS. 2 through 7.

First Embodiment

FIG. 2 is a drawing that shows the armature plate that forms the electromagnetic clutch, and the armature plate 34 is formed by laminating in plurality thin metal plates 41 having a thickness of about, for example, 0.3 to 1.0 mm. These thin metal plates 41 are magnetic bodies made of, for example, S12, S15, S17, or SPCC (SPCC-E provided by Shin Nihon Manufacturing can also be used). In addition, among these thin metal plates 41, the thin metal plate (on the right side in the figure) on the friction surface side that abuts the end surface of the drive rotor is called the friction disk (42).

Thus, the armature plate 34 is a six-layer laminated structure formed by laminating a plurality of thin metal plates 41 (five plates in this example), and attaching and aligning a friction disk 42 on the friction surface side that abuts the end surface of the drive rotor.

Figure 2B:
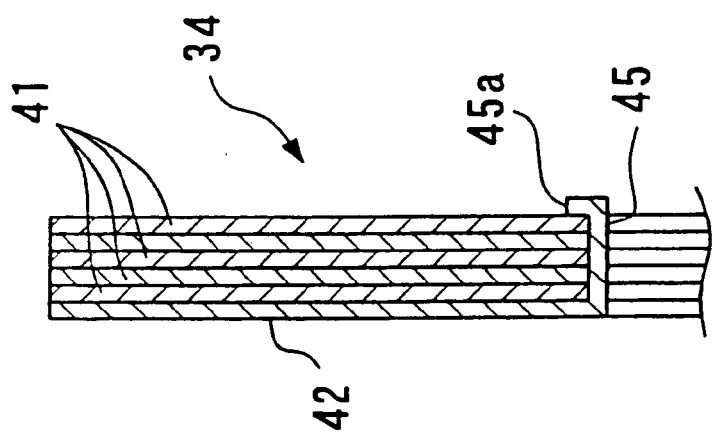
Figure 2A:
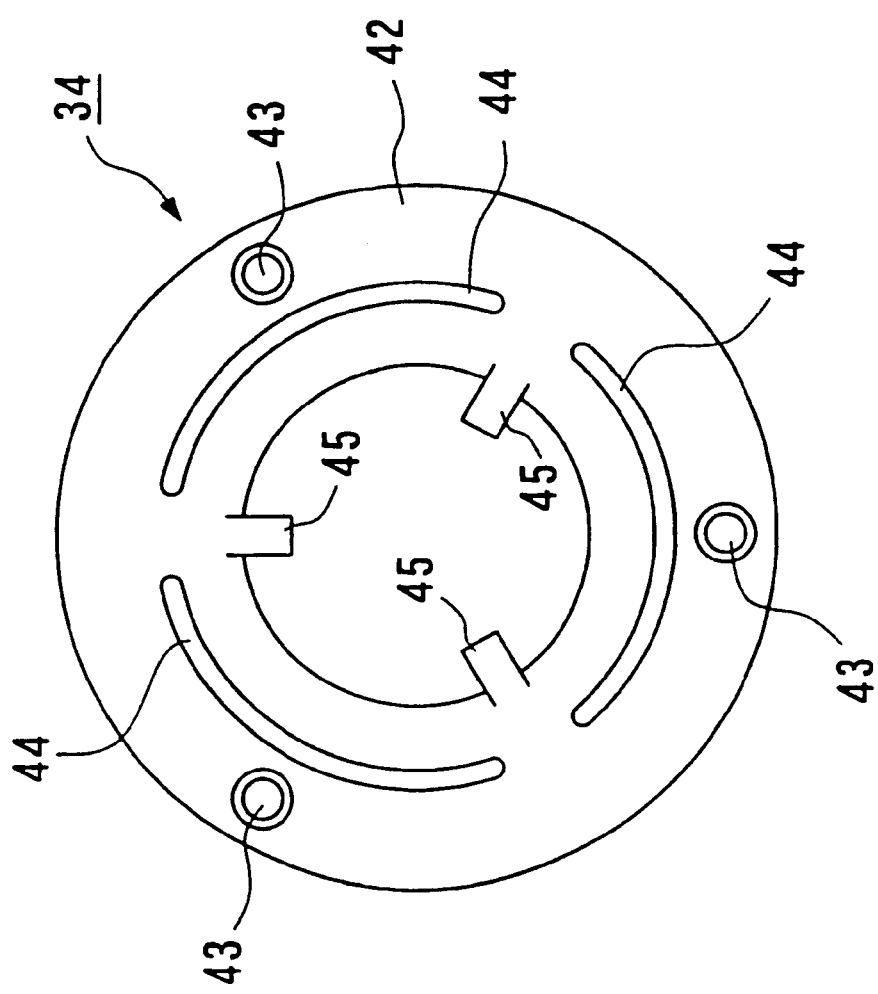
Figure 8:
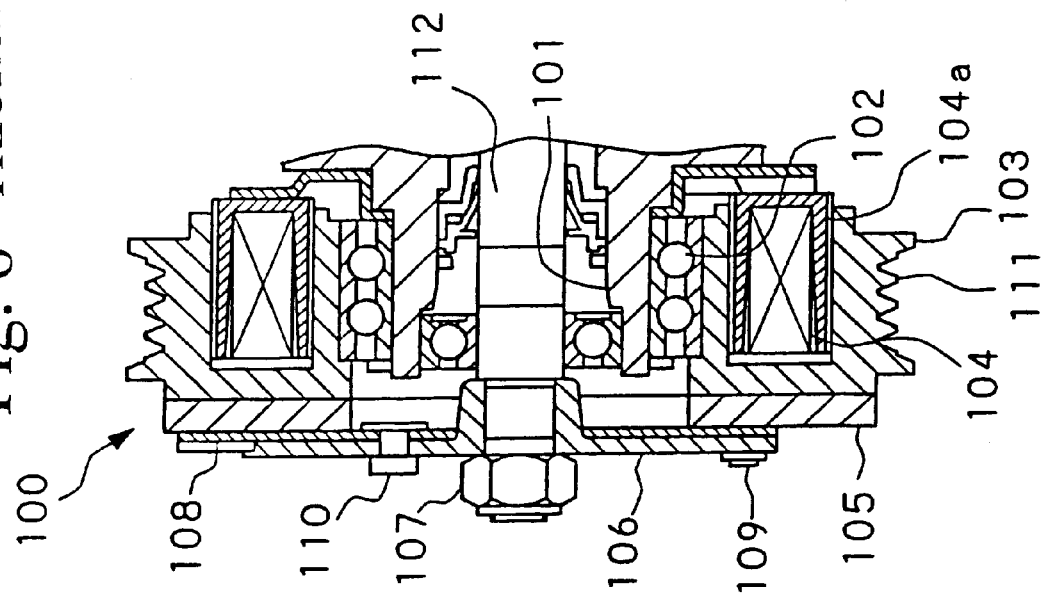
FIG. 8 is a cross-sectional drawing showing an example of a conventional electromagnetic clutch.
Figure 7:
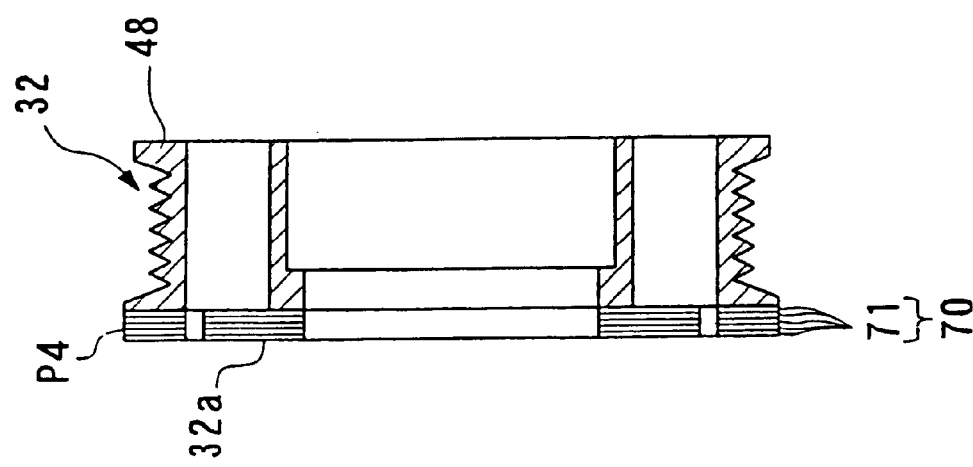
FIG. 7 is as cross-sectional drawing of the drive rotor.

FIG. 2A is a planar drawing showing the armature plate 34 from the friction surface side, that is, the friction disk 42 side.

This armature plate 34 has a ring shape with a cavity formed in the center, and holes 43 for connection to the connection plate passing through the armature plate 34 are provided at three locations on the same circle at equal angles. Furthermore, long holes 44 that pass therethrough are on the same circle as the holes 43 for connection and are respectively provided between each of the holes 43 for connection.

In addition, among the metal thin plates 41 that form the armature plates 34, integrating elements in the form of fastening tongues 45 are provided on the friction disc 42 that abuts the end surface of the drive rotor. These fastening tongues 45 are a rectangular part provided projecting towards the center from the inner diameter side of the ring shape, and are provided at three locations in the example in the figure at a 120 pitch.

After laminating the plurality of thin metal plates 41 and the friction disk 42, as shown in FIG. 2B, the fastening tongues 45 are bent into a substantially L-shape, and fastened so as to surround at three locations the area of the end on the inner diameter side of the other laminated thin metal plates. The armature plate 34 is integrated by this fastening. More specifically, distal ends 45a of a fastening tongues 45 are bent until they are substantially parallel to the friction disk 42, and then the other thin metal plates 41 are anchored by being sandwiched between these distal ends 45a and the friction disk 42. In integration by this type of fastening, each of the thin metal plates 41 need only be made so as not to become separated when clutch torque is applied, and thereby, by this type of integration, a minute air layer is formed between each of the thin metal plates 41. Thus, the number of fastening tongues 45 and their disposition is not limited to three locations, but can be appropriately determined depending on the conditions such as the clutch torque.

Because integration of the armature plate 34 by this type of fastening is attained by deforming the fastening tongues 45 to a specified shape by using an appropriate apparatus, reliable fastening becomes possible within a short operation time in comparison to, for example, anchoring members to each other by welding, automatic clamping, rivets, or the like. Thereby, an armature plate 34 comprising a plurality of laminated plates can be provided at a low manufacturing cost.

In the first embodiment described above, the fastening tongues 45 are provided on the inner diameter side of the friction disk 42, but this is not limiting, and for example, as shown in FIG. 3, can be provided projecting on the outer surface plate of the ring shape, and integration is carried out by fastening the fastening tongues 45.

In addition, in the case that the clutch torque is large, fastening tongues 45 can be provided on both the inner diameter and the outer diameter as necessary, and integration by anchoring with a larger force is possible.

Second Embodiment

FIG. 4A is a planar drawing showing the armature plate 34 from the friction surface side, that is, the friction disk 42.

This armature plate 34 has a ring shape with a cavity formed in the center, and holes 43 for connection with the connection plate passing through the armature plate 34 are provided at three locations on the same circle at equal angles. Furthermore, long holes 44 that pass therethrough are on the same circle as the holes 43 for connection, and are each provided between each of the holes 43 for connection.

In addition, among the thin metal plates 41 that form the armature plate 34, cylindrical-shaped bar-ring integrating parts 50 are provided on the friction disk 42 that abuts the end surface of the drive rotor. These bar-ring integrating parts 50 are provided projecting to the side opposite to the friction surface, and are inserted into the through holes 51 in the laminated thin metal plates 41a and 41b. In this case, the height of the projection of a bearing formation part 50 set such that even after carrying out the fastening described below, it passes through the through hole 51 without projecting from the surface on the opposite side. Moreover, in the example in the figure, the bar-ring integrating parts 50 and the through holes 51 are provided at three locations in the armature plate 34 at a 120° pitch, but this is not limited thereby.

As shown in FIG. 4B, in the through holes 51 described above, the through holes 51a in the three thin metal plates laminated on the friction disk 42 side and the through holes 51b in the two thin metal plates 41b laminated on the outer side have different inner diameters. The reason for this is that the bearing formation part 50 inserted into the through hole 51 is fastened in the direction of expansion of the diameter, and by bending the distal end 50a so as to deform outwards, a space for preventing extraction is secured. Therefore, the through holes 51a have a smaller diameter than the through holes 51b.

Moreover, in the case of this type of structure, depending on necessity, rivets or the like (omitted from the figures) can be used together to implement a more reliable integration.

By using this type of fastening structure, by the simple operation of fastening by inserting the bearing formations 50 into the through holes 51, the armature plate (laminated plate) 34 comprising a plurality of laminated thin metal plates 41 can be integrated, and thus the reliably integrated armature plate 34 can be manufactured in a short period of time and at a low cost. In addition, with this type of fastening structure, the central opening of the bar-ring integrating parts 50 fastened by being inserted into the through holes 51 also functions as a magnetic flux blocking slit, and thus there is also the effect that the leakage of the magnetic flux is decreased.

Moreover, the bar-ring integrating parts 50 inserted into the through holes 51 are fastened by expanding the diameter in the inside without extending outside of the through holes 51, and thus with this kind of fastening structure, the friction surface can provide bar-ring integrating parts on the plate on the end surface side that is opposite to the friction surface.

In addition, the fastening structure shown in FIG. 5 is a modified example of the second embodiment described above, and the distal end 50a of a bearing formation part 50 has a height that just passes out of the through holes 51. In this case, the diameter is expanded in a manner similar to that described above, and after the distal end 50a of a bearing formation part passes through a through hole 51, it is bent outwards so as to fasten on the end surface of the opposite side, and fastened so as to support the other flat metal plates 41 by sandwiching them between the friction disk 42 and the distal end part 51a. In this type of structure as well, operational effects are attained similar to those of the second embodiment described above.

Moreover, in this type of fastening structure, in which a bearing formation part 50 passes through a through hole 51, only the plate on the friction surface, that is, the friction disk 42, can provide the bar-ring integrating parts 50.

Third Embodiment

FIG. 6A is a planar drawing showing the armature plate 34 from the friction surface side, that is, the friction disk 42 side.

This armature plate 34 has a ring shape with a cavity in the middle, and holes 43 for connection with the connection plate are provided at three locations on the same circle separated at equal angles. Furthermore, long holes 44 between each of the holes 44 for connection each pass through on the same circle as the holes for connection 43.

This embodiment differs from the second embodiment described above in that cylindrical bar-ring integrating parts 50 and 52 each having different diameters are provided on the plate of both end surface sides of the armature plate 34, that is, the friction disk 42, comprising a plurality of laminated thin metal plates and the thin metal plate (hereinbelow, called "end surface plate 41c") provided on the end surface of the opposite side, and at the same time, through holes 51a and 51b are provided in the other thin metal plates 41a and 41b. In the example illustrated, the respective outer diameter and inner diameter are set such that the bar-ring integrating parts 50 of the friction disk 42 can be engaged in the bearing formation part 52 of the end surface plate 41c.

In addition, after the thin metal plates that have through holes 51a bored therethrough that are aligned on the outer diameter of the bearing formation part 50 are laminated on the friction disk 42 and the thin metal plates 41b having bored therethrough through holes 51b that are aligned on the outer diameter of the bearing formation part 52 are laminated on the end surface member 41b, the armature plate 34 is integrated by the bar-ring integrating parts 50 on the friction disk 42 side being inserted and engaged in the bar-ring integrating parts 52 on the end surface plate 41c, and then both the bar-ring integrating parts 50 and 52 are fastened by expanding their diameter.

Alternatively, after the bar-ring integrating parts 52 are inserted into the through holes 51b from both sides on which the thin metal plates 41a and 41b have been laminated, and the bar-ring integrating parts 50 are inserted into and engaged with the inner diameter part of the through holes 51a and the bar-ring integrating parts 51b, the armature plate 34 is integrated by both bearing parts 50 and 52 being fastened by expanding their diameters.

In this case, the projection height of the bearing formation part 52 having a large diameter is the same or slightly smaller than that of the laminated thin metal plates 41b, and the projection height of the bar-ring integrating parts 50 having the small diameters preferably have a height that passes through the end surface plate 41c but does not project from the opposite side. Thereby, the bearing formation part of either the friction disk 42 or the end surface plate 41c can serve as the side providing the bar-ring integrating parts 50 having the small diameters.

Moreover, although not illustrated, the height of the end surface part of the bar-ring integrating parts 50 on the friction disk 42 side, which are set so as to pass through the end surface plate 41c but not project from the opposite side, can be fastened by being bent in the same manner as the distal end part 50a shown in FIG. 5B.

By using such a fastening structure, because an armature plate (laminated body) 34 comprising a plurality of laminated thin metal plates can be integrated by the simple operation of fastening by engaging the bar-ring integrating parts 50 and 52 that have been inserted in the through holes 51a and 51b, a reliably integrated armature plate 34 can be manufactured in a short period of time and at a low cost. In addition, with this kind of fastening structure, the center opening of the bar-ring integrating parts 50 and 52 fastened by insertion into the through holes 51a and 51b functions also as a magnetic flux blocking slit, and thus there is also the effect of decreasing the magnetic flux leakage.

In each of the above embodiments, an example of an application to an armature plate 34 comprising a plurality of laminated plates was explained. However, the present invention can be applied to the wall part 70 that forms the end surface 32a of the drive rotor 32 shown in FIG. 7. Moreover, the wall part 70 is the surface to which the armature plate 34 that engages due to the current to the coil 33 adheres.

In this case as well, the wall part 70 can be formed by a plurality of laminated plates (thin metal plates 71), can be used on the first embodiment through the third embodiment described above as a fastening structure that forms a laminated body by integrating each plate, and can attain the same operational effect.

In addition, it is also possible for the wall parts 70 of both the armature plate 34 and the drive rotor 32 to be laminated bodies, and serve as an electromagnetic clutch using a fastening structure identical to each of the embodiments described above. Additionally, when using the laminated body integrated by the fastening structure described above on the armature plate 34 and the wall part 70 or on both the armature plate 34 and the wall part 70, due to the minute air layer formed between each of the plates, the shock during coupling due to the armature plate 34 being engaged to the wall part 70 can be moderated, and the shock sound can be decreased.

In each of the embodiments described above, an explanation was given for a scroll compressor, but the present invention is not limited thereby, and can be also applied to other compressors, such as a rotary compressor or a reciprocating compressor.

In addition, in the present embodiments, a case was explained wherein the end surface of the drive rotor and the armature plate engage due to the magnetic force of the coil when the coil was energized by the application of voltage, but the present invention also includes the case in which the end surface of the drive rotor and the armature plate are separated by the magnetic force of the coil.

According to the electromagnetic clutch of the present invention described above, because at least one of the armature plate or the end surface of the drive rotor is formed by a laminated body, and is formed such that this laminated body is integrated by fastening, the operational time can be shortened compared to welding, automatic clamping, or rivets, and a low cost, reliably integrated laminated body can be obtained. Thereby, due to the presence of a minute air layer, an electromagnetic clutch that can reduce the shock noise due to the presence of a minute air layer can be provided as low cost.

In particular, with respect to both the armature plate and the end surface of the drive rotor, by applying the low cost laminated body having the structure described above, the effect of decreasing the shock sound can be dramatically improved at low cost.

In addition, by using such an electromagnetic clutch, a low-noise compressor can be provided.

What is claimed is:

1. An electromagnetic clutch comprising a drive rotor that is connected so as to communicate with a drive source and has a built in coil, and an armature positioned opposite to said drive rotor and having an armature plate disposed on the same rotation axis line, in which the end surfaces of said drive rotor and said armature plate are engaged or separated due to the magnetic force of said coil when said coil is energized by the application of voltage, and said drive rotor and said armature are intermittently coupled in communication;

wherein said armature plate is a laminated body comprising a plurality of plates, wherein at least one of said plates comprising an end surface of said armature plate comprises a plurality of integrating elements protruding therefrom, said laminated body being integrated by said integrating elements, wherein at least one of said integrating elements protrudes from one of said plates which comprises a friction plate engageable with said drive rotor, and wherein said at least one of said integrating elements is bent so as to surround the other laminated plates such that they are fastened.

2. A compressor which compresses a fluid by compression elements, wherein the power of a drive source is mechanically connected to said compression elements via the electromagnetic clutch according to claim 1.

3. The electromagnetic clutch of claim 1, wherein said at least one integrating element comprises a fastening tongue.

4. An electromagnetic clutch comprising a drive rotor that is connected so as to communicate with a drive source and has a built in coil, and an armature positioned opposite to said drive rotor and having an armature plate disposed on the same rotation axis line, in which the end surfaces of said drive rotor and said armature plate are engaged or separated due to the magnetic force of said coil when said coil is energized by the application of voltage, and said drive rotor and said armature are intermittently coupled in communication;

wherein said armature plate is a laminated body comprising a plurality of plates, at least one of said plates comprising an end surface of said armature plate including a plurality of integrating elements protruding therefrom, said laminated body being integrated by said integrating elements, wherein a plurality of said integrating elements protrudes from one of said plates which comprises a friction plate engageable with said drive rotor, and wherein each of said plurality of integrating elements is bent so as to surround the other laminated plates such that they are fastened.

5. The electromagnetic clutch of claim 4, wherein said plurality of integrating elements comprise fastening tongues.

6. The electromagnetic clutch of claim 4, wherein said plurality of integrating elements comprise cylindrical bar rings.

* * * * *